United States Patent
Hsieh et al.

(10) Patent No.: US 11,797,068 B2
(45) Date of Patent: Oct. 24, 2023

(54) POWER MANAGEMENT CONTROL METHOD IN USE OF CONNECTOR

(71) Applicant: Leadtrend Technology Corporation, Zhubei (TW)

(72) Inventors: Yao-Wei Hsieh, Zhubei (TW); Hung Kuang Liu, Zhubei (TW); Hsien-Te Huang, Zhubei (TW); Ming-Chang Tsou, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 93 days.

(21) Appl. No.: 17/512,949

(22) Filed: Oct. 28, 2021

(65) Prior Publication Data

US 2022/0155837 A1   May 19, 2022

Related U.S. Application Data

(60) Provisional application No. 63/115,018, filed on Nov. 17, 2020.

(30) Foreign Application Priority Data

Aug. 19, 2021   (TW) .................. 110130672

(51) Int. Cl.
*G06F 1/26*   (2006.01)
*G06F 1/28*   (2006.01)

(52) U.S. Cl.
CPC ................ *G06F 1/266* (2013.01); *G06F 1/28* (2013.01)

(58) Field of Classification Search
CPC ........ G06F 1/266; G06F 1/28; G06F 13/4068; G06F 13/4282; Y02D 10/00; H04L 12/10
See application file for complete search history.

(56) References Cited

U.S. PATENT DOCUMENTS

| | | | | |
|---|---|---|---|---|
| 2008/0164890 | A1* | 7/2008 | Admon | H04L 12/10 324/713 |
| 2008/0229120 | A1* | 9/2008 | Diab | H04L 12/66 324/105 |
| 2008/0252307 | A1* | 10/2008 | Schindler | G06F 1/266 324/691 |
| 2008/0311877 | A1* | 12/2008 | Darshan | G06F 1/266 455/402 |
| 2019/0004584 | A1* | 1/2019 | Nge | G06F 13/4282 |
| 2021/0208648 | A1* | 7/2021 | Venkideswaran | H02J 7/007192 |

* cited by examiner

*Primary Examiner* — Phil K Nguyen
*Assistant Examiner* — Brian J Corcoran
(74) *Attorney, Agent, or Firm* — McClure, Qualey & Rodack, LLP

(57) ABSTRACT

A connector controller controls a connector with a power pin, a communication pin, and a ground pin. The connector detects the voltage at the communication pin at least twice to generate first and second voltages respectively. A bus power is supplied at the power pin. The first voltage is detected when a bus current to/from the bus power is about zero. The connector controller controls the bus power in response to a difference between the first and second voltage.

17 Claims, 5 Drawing Sheets

POWER MANAGEMENT CONTROL METHOD IN USE OF CONNECTOR

CROSS-REFERENCE TO RELATED APPLICATION

This application claims priority to and the benefit of U.S. provisional Application No. 63/115,018 filed on Nov. 17, 2020, and Taiwan Application Series Number 110130672 filed on Aug. 19, 2021, which are hereby incorporated by reference in their entirety.

BACKGROUND

The present disclosure relates generally to connector controllers, and more particularly to connector controllers that manage power supplied to a cable based on a voltage difference detected from the cable.

Various portable electronic products nowadays use USB (universal series bus) cables for charging the batteries they carry. Traditional USB type-A cables only allow to transmit power up to 2.5 W (5V at 0.5 A) for charging. A USB type-C cable however supports up to 15 W (5V at 3 A), which rises to 100 W (up to 20V at 5 A) with USB Power Delivery feature.

A USB cable whose cable resistance is too high for example might cause several problems when delivering high current output to a rechargeable electronic device, a sink device. For example, the output voltage that a source device supplies to the USB cable might be mostly consumed by the USB cable, and the sink device connected to the USB cable therefore receives an over-low charging voltage. The time for being fully-charged may become too long to tolerate. Furthermore, the resistance of the USB cable might convert most of the power output from the source device into heat, probably causing hazardous fire.

It is an object in the art to monitor the quality of a USB cable, and in response to manage the power that is delivered over it.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

In this specification, embodiments of the invention use USB type-C cables and connectors for demonstration, but the invention is not limited to. Some embodiments of the invention might use other types of cables or connectors as well.

Figure 1:
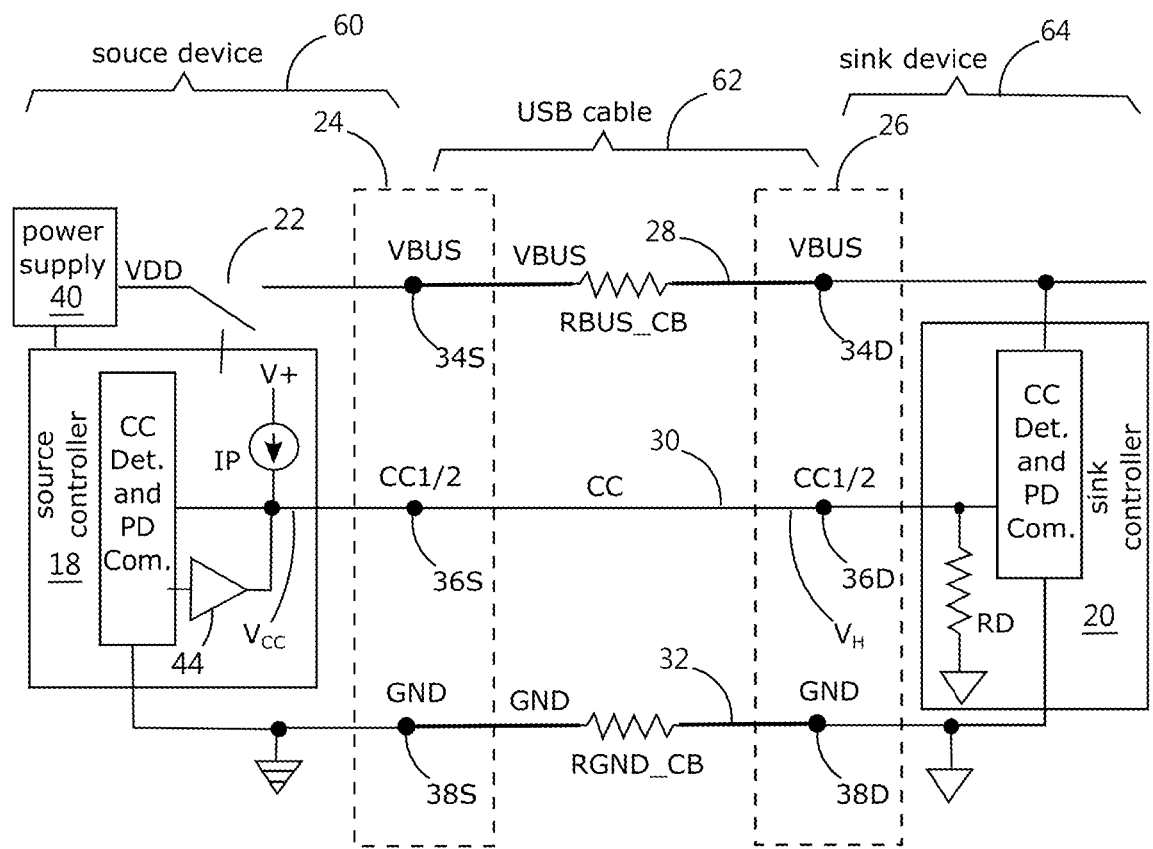
FIG. 1 demonstrates the USB type-C cable 62 connects source device 60 and drain device 64.

FIG. 1 demonstrates an embodiment of the invention, where source device 60 and sink device 64 are electrically attached or connected to each other by USB type-C cable 62. Source device 60 is capable of supplying power to sink device 64 via USB type-C cable 62.

USB type-C connector 24, which is a plug or a receptacle for instance, connects source device 60 and USB cable 62. Even though USB type-C technology defines 24 pins for connectors, connector 24 in FIG. 1 only shows, in brief, three pins: VBUS power pin 34S, CC1/2 communication pin 36S, and GND ground pin 38S, where CC1/2 communication pin 36S is either CC1 or CC2 pin that connects to configuration channel (CC) line 30 of USB cable 62. Analogously, USB type-C connector 26 connects sink device 64 and USB cable 62 and briefly shows in FIG. 1 only three pins: VBUS power pin 34D, CC1/2 communication pin 36D, and GND ground pin 38D. USB cable 62 illustrates VBUS power line 28, CC line 30 and GND ground line 32, where resistors RBUS_CB and RGND_CB represent the equivalent resistances over VBUS power line 28 and GND ground line 32 respectively.

Source controller 18 in source device 60 controls power supply 40, power switch 22, and connector 24. Source controller 18 manages power supply 40 to supply VDD power compliant with power regulations or power demand from sink device 64. Power switch 22, when turned ON to perform a short circuit, connects VDD power to VBUS power line 28, such that VBUS power is built up on VBUS power line 28 to supply power to sink device 64.

Sink controller 20 in sink device 64 determines how much power it sinks from VBUS power, and communicates with source controller 18 by exchanging data through one or more communication pins.

For cable attachment and detachment detection, source device 60 asserts on CC1/2 communication pin 36S current source IP pulling up voltage $V_{CC}$, and sink device 64 asserts on CC1/2 communication pin 36D pull-down resistor RD pulling down voltage $V_H$. Once connection between sink controller 20 and source controller 18 is established, current source IP provides a constant current going through pull-down resistor RD to fix both voltages $V_{CC}$ and $V_H$.

For power negotiation after the connection is made between source device 60 and sink device 64, messages exchange between source device 60 and sink device 64 over CC line 30 of USB cable 62, and these messages are BMC (Bi-phase mark code) encoded. Source device 60 and sink device 64 negotiate a contract for the power objects according to the protocol described in USB Power Delivery specification. For example, source controller 18 manages driver 44 to send BMC data to sink controller 20 which controls connector 26.

According to embodiments of the invention, source controller 18 can estimate the voltage drop over GND ground line 32 of USB cable 62 connecting between source device 60 and sink device 64, to manage VBUS power on VBUS power line 28. Source controller 18 detects twice voltage $V_{CC}$ at CC1/2 communication pin 36S, to respectively generate two records: primitive voltage $V_{CCO}$ and present voltage $V_{CCL}$. Primitive voltage $V_{CCO}$ is the voltage $V_{CC}$ when sink device 64 sinks very little or no current. In other words, primitive voltage $V_{CCO}$ is generated when bus current IBUS is about 0 A. Present voltage $V_{CCL}$ is the voltage $V_{CC}$ when sink device 64 sinks from VBUS power line 28 bus current IBUS. Difference Delta between present voltage $V_{CCL}$ and primitive voltage $V_{CCO}$ is about the voltage drop over GND ground line 32 of USB cable 62. Therefore, source controller 18 could, for example, perform load compensation, slightly increasing the target voltage of VBUS power to compensate the voltage drop. In case that the quality of USB cable 62 is so bad that resistor RGND_CB seemingly has very high resistance, difference Delta might become over high, and source controller 18 in response could stop sustaining VBUS power to avoid any possible hazard from happening. For example, an over-high difference Delta could cause source controller 18 to turn OFF power switch 22, disconnecting VDD power from VBUS power line 28, so source device 60 stops supplying power to sink device 64.

Figure 2:
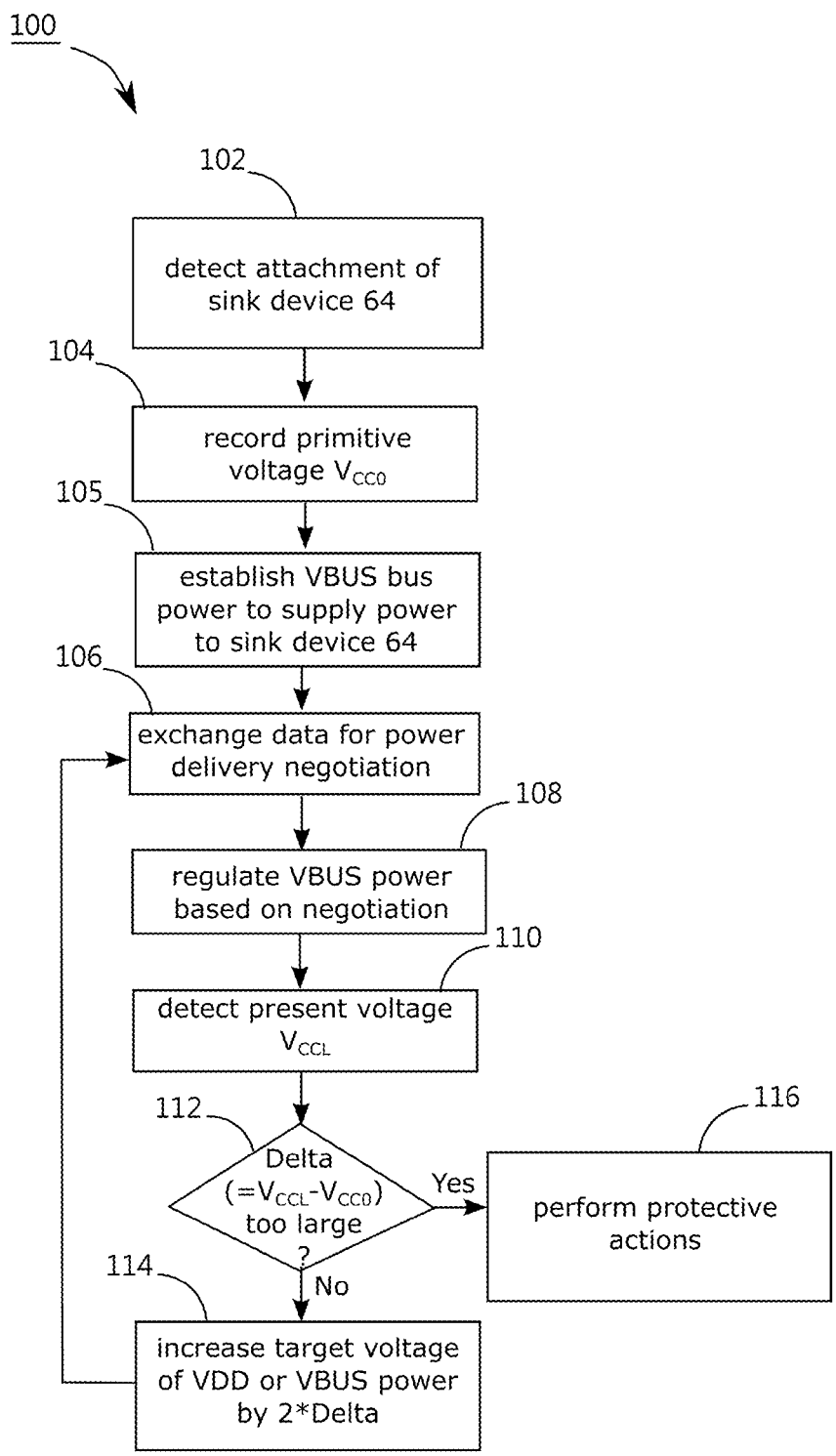
FIG. 2 shows power management method 100 that source controller 18 uses.
Figure 3:
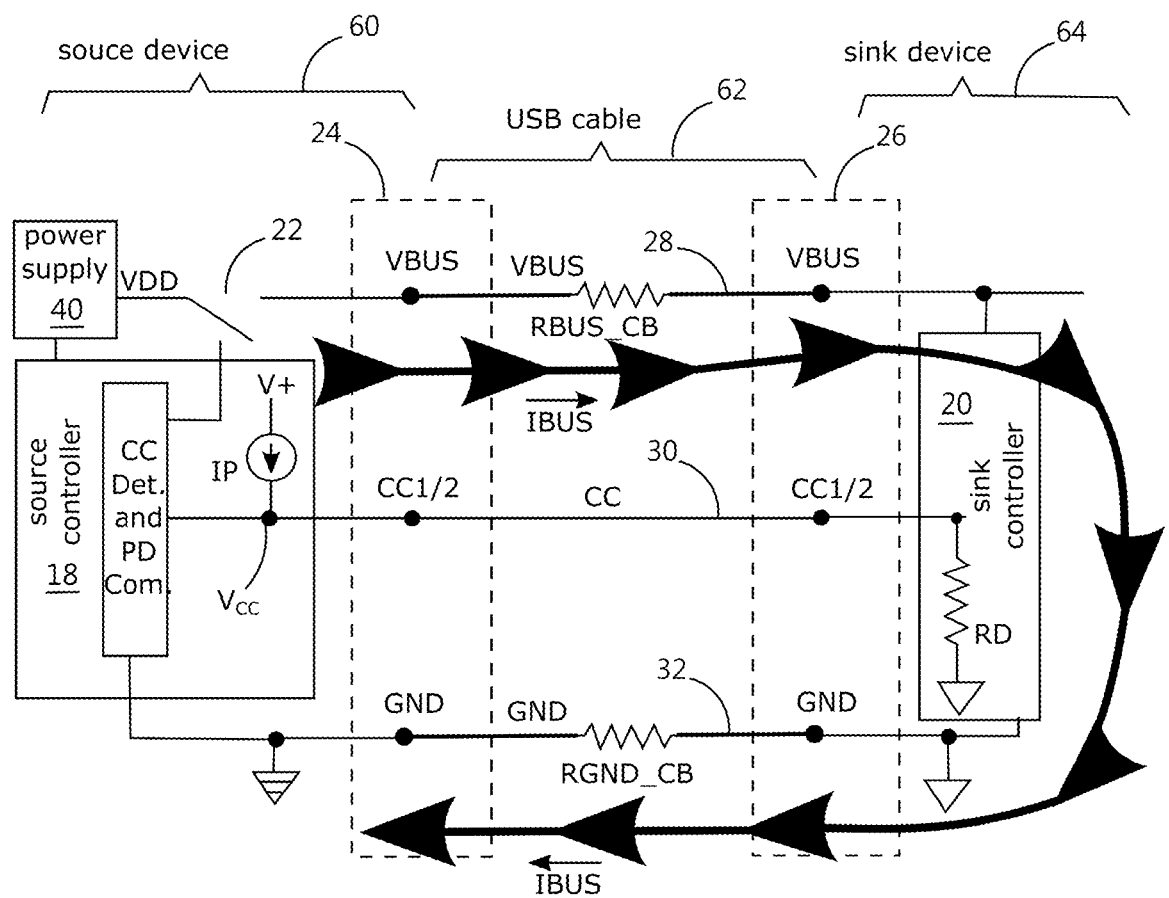
FIG. 3 shows bus current IBUS going through VBUS power line 28 and GND ground line 32 when source controller 18 detects the attachment of sink device 64.

Please refer to both FIGS. 2 and 3, where FIG. 2 shows power management method 100 source controller 18 uses, and FIG. 3 shows bus current IBUS goes through VBUS power line 28 and GND ground line 32, to supply power to sink device 64 when source controller 18 detects the attachment of sink device 64.

In step 102, source controller 18 detects the attachment of sink device 64, by reading the voltage at CC1/2 communication pin 36S. In case that sink device 64 does not electrically connect to source device 60, voltage $V_{CC}$ could be voltage V+, the maximum voltage that current source IP can pour to reach. Nevertheless, when sink device 64 connects to source device 60 via USB cable 62, pull-down resistor RD is going to pull down voltage $V_{CC}$. Therefore, if source controller 18 finds voltage $V_{CC}$ at CC1/2 communication pin 36S dropping from voltage V+, then source controller 18 can determine that electric connection between source device 60 and sink device 64 has been established.

In step 104, source controller 18 generates a record of voltage $V_{CC}$ as primitive voltage $V_{CCO}$. In the meantime, sink device 64 hardly consumes power supplied by VBUS power on VBUS power line 28, or bus current IBUS is very little or about 0 A. Equation (I) below demonstrates the relationship between voltage $V_{CC}$ at CC1/2 communication pin 36S and value $I_{BUS}$ of bus current IBUS.

$$V_{CC}=I_P*R_D+I_{BUS}*R_{GND\_CB} \quad (I)$$

where $I_P$ is the current supplied by current source IP, $R_D$ the resistance of pull-down resistor RD, and $R_{GND\_CB}$ the effective resistance of GND ground line 32. As value $I_{BUS}$ in step 104 is about 0 A, it is concluded that primitive voltage $V_{CCO}$ equals about $I_P*R_D$.

Step 105 shows that source controller 18 turns ON power switch 22, connecting VDD power to VBUS power pin 34S and VBUS power line 28, to establish VBUS bus power supplying power to sink device 64. For example, step 105 regulates VBUS bus power at 5V.

In step 106, source controller 18 and sink controller 20 exchange data through CC line 30 for power negotiation. In half duplex mode, source controller 18 and sink controller 20 take turns to send BMC messages to each other, and negotiate the ratings of VBUS bus power according to the protocol described in USB Power Delivery specification.

In step 108, source controller 18 manages power supply 40 to regulate VDD power and VBUS power according to the result of power negotiation. For example, in response to power negotiation, source controller 18 might first turn OFF power switch 22 to disconnect VDD power from VBUS power line 28, controls power supply 40 to boost VDD power from 5V up to 20V, and, when VDD power is ready at 20V, turns ON power switch 22, through which VDD power establishes VBUS power of 20V on VBUS power line 28.

Step 110 follows step 108, where source controller 18 detects voltage $V_{CC}$ at CC1/2 communication pin 36S and generates a record as present voltage $V_{CCL}$. Supposing bus current IBUS is of value $I_{BUS\_PT}$ in the meantime, present voltage $V_{CCL}$ is about $I_P*R_D+I_{BUS\_PT}*R_{GND\_CB}$. Value $I_{BUS\_PT}$ might be obtained by a current-sense resistor connected to VBUS power pin 34S to sense the current from VBUS power pin 34S into VBUS power line 28, or to GND ground pin 38S to sense the current from GND ground line 32 into GND ground pin 38S. Based on the above analysis, difference Delta, the difference between present voltage $V_{CCL}$ and primitive voltage $V_{CCO}$, is about $I_{BUS\_PT}*R_{GND\_CB}$, which substantially equals the voltage drop over GND ground line 32 of USB cable 62. Therefore, in step 112, source controller 18 checks difference Delta to estimate the quality of GND ground line 32.

If difference Delta is below a predetermined value, 0.25V for example, the quality of GND ground line 32 is seemingly good for source controller 18 to accept. In step 114, which follows the negative answer of step 112, source controller 18 uses cable compensation to compensate the voltage drop due to cable impedance for providing a regulated voltage to sink device 64. Source controller 18 increases the target voltage that VDD power is regulated at by 2*Delta. For example, if the target voltage according to power negotiation in step 108 is 20V, and difference Delta derived from step 112 is about 0.1V, then source controller 18 in step 114 sets the target voltage now as 20.2V, so as to regulate VDD or VBUS power at 20.2V. The increment of 0.2V can substantially compensate the voltage drop caused by resistors RBUS_CB and RGND_CB, so sink device 64 can receive from VBUS power pin 34D and GND ground pin 38D a power source of about 20V, as negotiated before.

Power management method 100 goes back to step 106 after finishing step 114, to once again exchange data through CC line 30 for power negotiation. If the quality of GND ground line is seemingly good, or difference Delta is below the predetermined value, the loop consisting of steps 106, 108, 110, 112 and 114 continues.

Once difference Delta becomes larger than the predetermined value, it might imply that the quality of GND ground line 32 is too bad to accept, so source controller 18 in step 116 does some protective actions to prevent hazardous events from occurring. These protective actions include, but are not limited to include, one of the followings: 1. turning OFF power switch 22 to stop supplying power to VBUS power pin 34S; 2. regulating VDD power to act as a predetermined, limited power source, which supports up to 5V at 0.5 A for example; and/or 3. informing sink device 64 the stop or the change of supplying power.

In one scenario, difference Delta is over large (larger than the predetermined value), but source controller 18 does not find anything wrong in bus current IBUS, or value $I_{BUS\_PT}$ is acceptable in its appearance. This scenario might happen when bus current IBUS is over large in fact, but the current sensor for sensing bus current IBUS malfunctions and sends fault information to source controller 18. In step 116 of FIG. 2, source controller 18 can perform the protective actions such that source device 60 complies with limited power source (LPS) requirements. For example, if difference Delta is determined to be over large, or more than 0.25V, then source controller 18 rapidly turns OFF power switch 22 to stop supplying current to sink device 64, even though source controller 18 deems bus current IBUS not exceeding 8 A, which is the maximum current defined by LPS requirements.

The predetermined value to be compared with difference Delta in step 112 might depend to one or more variables, according embodiments of the invention. In one embodiment of the invention, source controller 18 sets a maximum value $R_{GND\_CB\_MAX}$, which makes the predetermined value equal the product of $R_{GND\_CB\_MAX}$ and $I_{BUS\_PT}$, and source controller 18 executes step 116 if difference Delta exceeds that product. In other words, source controller 18 controls VBUS power in response to difference Delta and bus current IBUS.

According to embodiments of the invention, sink controller 20 can estimate $R_{GND\_CB}$, the effective resistance of GND ground line 32, to determine the use or the management of VBUS power on VBUS power line 28. Sink controller 20 detects twice voltage $V_H$ at CC1/2 communication pin 36D, to respectively generate two records: primitive voltage $V_{H\_O}$ and present voltage $V_{H\_L}$. Each of primitive voltage $V_{H\_O}$ and present voltage $V_{H\_L}$ is generated by detecting voltage $V_H$ when sink device 64 receives at CC1/2 communication pin 36D a relatively-high voltage level of logic "1" for power delivery negotiation. Primitive voltage $V_{H\_O}$ is the voltage $V_H$ when sink device 64 sinks very little or no current. In other words, primitive voltage $V_{H\_O}$ is generated when bus current IBUS is about 0 A. Present voltage $V_{H\_L}$, nevertheless, is the voltage $V_H$ when sink device 64 sinks from VBUS power line 28 bus current IBUS. Sink controller 20 can use a sensor, a resistor for example, to detect bus current IBUS, and to know $I_{BUS\_PT}$, the present value of bus current IBUS. For example, this current-sense resistor, for sensing bus current IBUS, might connect to VBUS power pin 34D to sense the current flowing from VBUS power line 28 into connector 26, or to GND ground pin 38D to sense the current flowing from connector 26 into GND ground line 32. With primitive voltage $V_{H\_O}$, present voltage $V_{H\_L}$, and value $I_{BUS\_PT}$ in hand, sink controller 20 is capable of estimating $R_{GND\_CB}$, the effective resistance of GND ground line 32, to perform some protective actions.

Figure 4:
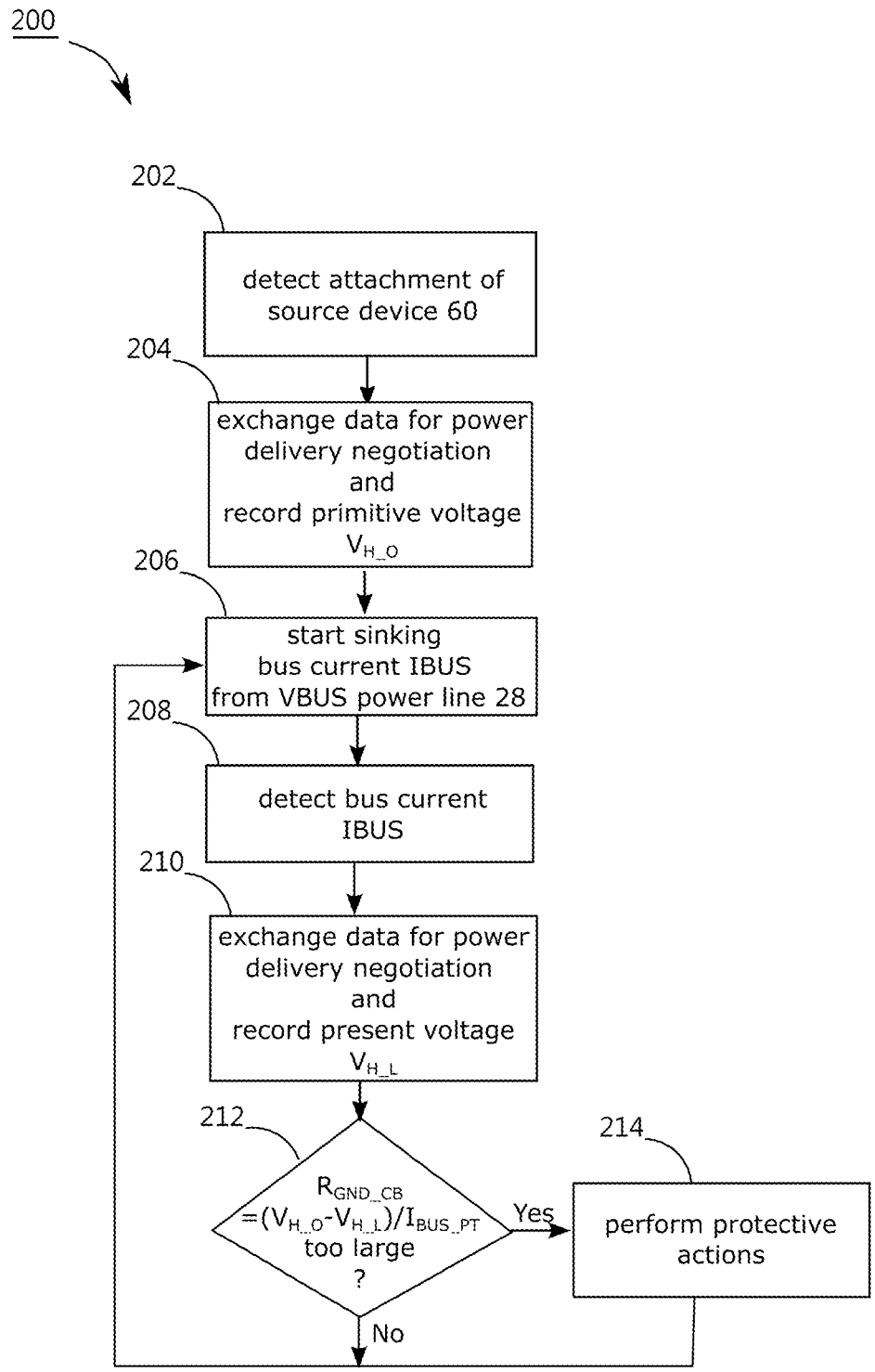
FIG. 4 shows power management method 200 that sink controller 20 uses.
Figure 5:
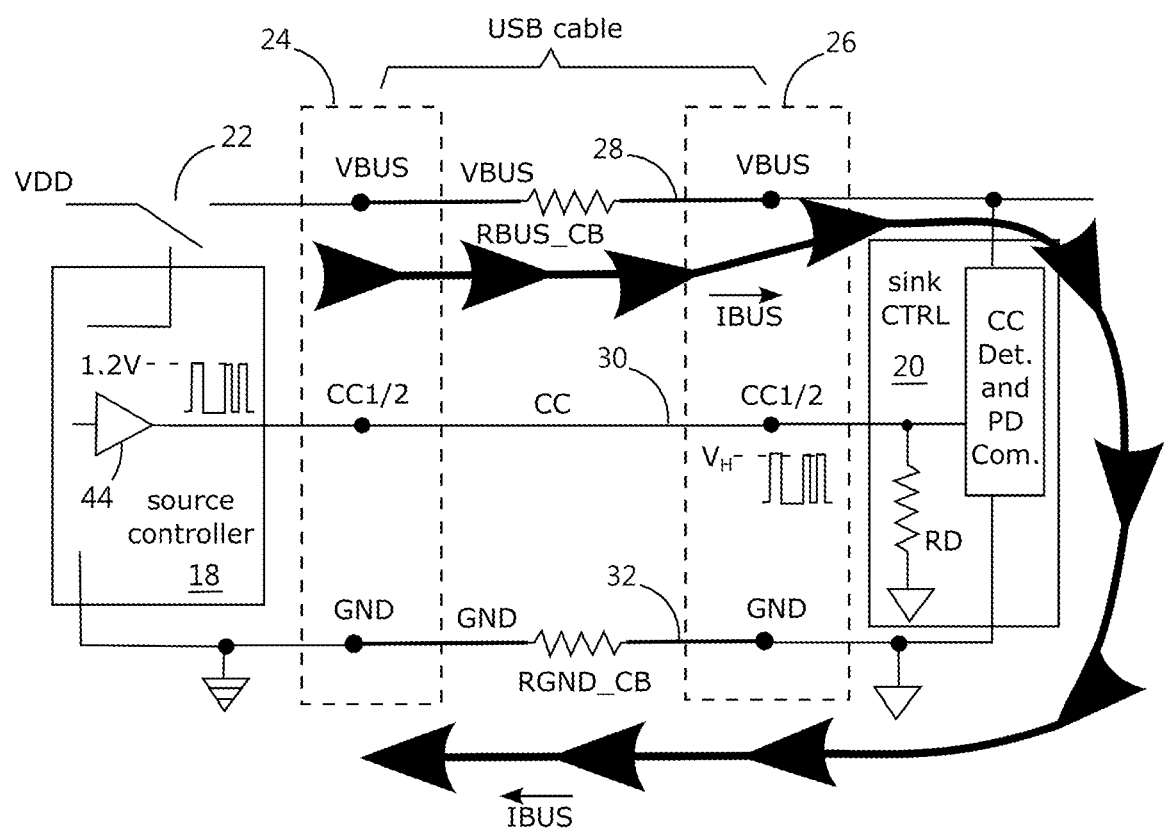
FIG. 5 bus current IBUS going through VBUS power line 28 and GND ground line 32 while source controller 18 sends to sink controller 20 BMC messages over CC line 30.

Please refer to both FIGS. 4 and 5, where FIG. 4 shows power management method 200 sink controller 20 uses, and FIG. 5 bus current IBUS going through VBUS power line 28 and GND ground line 32 while source controller 18 sends to sink controller 20 BMC messages over CC line 30.

In step 202, sink controller 20 detects the attachment of source device 60, by reading voltage $V_H$ at CC1/2 communication pin 36D. In case that source device 60 does not connect to sink device 64, voltage $V_H$ equals the ground voltage at GND ground pin 38D because of the existence of pull-down resistor RD. Nevertheless, when sink device 64 connects to source device 60 via USB cable 62, voltage $V_H$ is pulled up by current source IP in source device 60. Therefore, if sink controller 20 finds voltage $V_H$ significantly rising from 0V, then sink controller 20 can determine that electric connection between source device 60 and sink device 64 has been established.

In step 204, sink controller 20 and source controller 18 exchange data through CC line 30 for power delivery negotiation, and sink controller 20 detects voltage $V_H$ at CC1/2 communication pin 36D to generate a record as primitive voltage $V_{H\_O}$. In half duplex mode, source controller 18 and sink controller 20 take turns to send messages in form of BMC to each other, and negotiate the ratings of VBUS bus power according to the protocol described in USB Power Delivery specification. Step 204 is the first time the sink controller 20 and source controller 18 negotiate for power delivery. Shown in FIG. 5, source controller 18 uses driver 44 to send BMD messages to sink controller 20, where 1.2V is used as the relatively-high voltage level representing logic "1" and 0V the relatively-low voltage level representing logic "0", assuming the ground voltage at GND ground pin 38S is 0V. When sink device 64 receives a signal of logic "1" from CC line 30, voltage $V_H$ at CC1/2 communication pin 36D and $I_{BUS}$ (the value of bus current IBUS) have a relationship shown by equation (II) below $$V_H = 1.2V - I_{BUS} * R_{GND\_CB} \quad (II).$$

Meanwhile, sink device 64 does not supply much power to the load connected to sink device 64. For example, VBUS power on VBUS power line 28 only supplies power to sink controller 20 in step 204 when sink controller 20 turns OFF a switch substantially blocking any current from sink device 64 to the load. Therefore, sink device 64 sinks very little or no current in step 204, value $I_{BUS}$ is about 0 A, and primitive voltage $V_{H\_O}$ equals about 1.2V according to equation (II).

In step 206, sink controller 20 makes sink device 64 start sinking bus current IBUS from VBUS power line 28, to supply power to the load connected to sink device 64, after source device 60 has established VBUS power on VBUS power line 28 according to the result of power negotiation. For example, sink controller 20 turns ON a switch to connect the load to VBUS power line 28 in step 206.

Sink controller 20 monitors, in step 208, bus current IBUS, at the same time when sink device 64 supplies power to its load. Sink controller 20 could detect the voltage across a current-sense resistor connected to VBUS power pin 34D or GND ground pin 38D, to sense bus current IBUS. Accordingly sink controller 20 can know $I_{BUS\_PT}$, the present value of bus current IBUS.

In step 210, sink controller 20 and source controller once again exchange data through CC line 30 for power negotiation, and sink controller 20 detects voltage $V_H$ at CC1/2 communication pin 36D to generate a record as present voltage $V_{H\_L}$. Meanwhile, sink device 64 supplies power to the load connected to sink device 64. Therefore, present voltage $V_{H\_L}$ equals about $1.2V - I_{BUS\_PT} * R_{GND\_CB}$ according to equation (II).

Sink controller 20 in step 212 determines whether the quality of GND ground line 32 is acceptable based on present voltage $V_{H\_L}$, primitive voltage $V_{H\_O}$, and the present value of bus current IBUS, $I_{BUS\_PT}$. According to the above analysis, the difference between primitive voltage $V_{H\_O}$ and present voltage $V_{H\_L}$ is about $I_{BUS\_PT} * R_{GND\_CB}$, which equals substantially the voltage drop across GND ground line 32. By dividing the difference by $I_{BUS\_PT}$, the equivalent resistance of GND ground line 32, $R_{GND\_CB}$, can be acquired.

If $R_{GND\_CB}$ is below a predetermined value, the quality of GND ground line 32 is seemingly good for sink controller 20 to accept. Power management method 200 goes back to step 206 after finishing step 212, and bus current IBUS from VBUS power line 28 is drained to supply power to the load connected to sink device 64. If the quality of GND ground line 32 is seemingly good, or $R_{GND\_CB}$ is below the predetermined value, the loop consisting of steps 206, 208, 210, and 212 continues.

Once $R_{GND\_CB}$ becomes larger than the predetermined value, it might imply that the quality of GND ground line 32 is too bad to accept, so sink controller 20 in step 214 performs some protective actions to prevent hazardous events from occurring. These protective actions include, but are not limited to include, one of the followings: 1. reducing, from 5 A to 0.5 A for example, the maximum of bus current IBUS that sink device 64 is allowed to sink from VBUS power line 28; and, 2. asking source controller 18 via Power Delivery negotiation to regulate VBUS power at predetermined safe ratings, 5V at 0.5 A for example. These protective actions can constrain VBUS power or bus current IBUS, or limit the use of VBUS power, to prevent high temperature or hazardous fire caused by GND ground line 32 that possibly has unacceptably-high equivalent resistance.

Source controller 18 according to embodiments of the invention senses voltage $V_{CC}$ at CC1/2 communication pin 36S when detecting the attachment to sink device 64, to estimate the voltage drop over GND ground line 32, or the equivalent resistance of GND ground line 32, and accordingly to perform load compensation or some protective actions. Source controller 18 might be capable of complying with LPS requirements without any additional electronic devices for sensing bus current IBUS.

Sink controller 20 according to embodiments of the invention can sense voltage $V_H$ at CC1/2 communication pin 36D during power negotiation between sink controller 20 and source controller 18, to estimate the equivalent resistance of GND ground line 32, and accordingly to perform some protective actions.

Even though the embodiments in this specification detects voltages at CC1/2 communication pins for determining the voltage drop on GND ground line 32, or the equivalent resistance of GND ground line 32, but this invention is not limited to however. Embodiments of the invention might as well employ communication pins other than CC1/2 communication pins, for the determination of the quality of GND ground line 32.

While the invention has been described by way of examples and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power management method for controlling a first connector with a power pin and a communication pin, the power management method comprising:
    recording a first voltage by detecting the communication pin when the first connector is electrically attached to a second connector via the power pin and the communication pin;
    detecting the communication pin to generate a second voltage when a bus power is supplied over the power pin;
    controlling the bus power in response to a difference between the first and second voltages; and
    adjusting a target voltage that the bus power is regulated at by an amount proportional to the difference.

2. The power management method as claimed in claim 1, wherein the communication pin is supplied with a constant current from a current source, and the first voltage is recorded when no current or little current is supplied over the power pin.

3. The power management method as claimed in claim 2, comprising:
    not supplying power to the bus power when the difference exceeds a predetermined value.

4. The power management method as claimed in claim 1, comprising:
    determining, based on detection to the communication pin, whether the first connector is electrically attached to the second connector.

5. The power management method as claimed in claim 1, comprising:
    exchanging data via the communication pin for power delivery negotiation.

6. The power management method as claimed in claim 1, comprising:
    exchanging between connector controllers connected to the first and second connectors respectively BMC data over the communication pin to manage power delivery.

7. A power management method for controlling a connector with a power pin, a communication pin and a ground pin, the power management method comprising:
    providing a constant current to the communication pin;
    detecting the communication pin to determine attachment of a sink device and to record a first voltage;
    supplying a bus power to the sink device via the power pin;
    detecting the communication pin to determine attachment of the sink device and to record a second voltage when the bus power is supplied;
    controlling the bus power in response to a difference between the first and second voltages; and
    adjusting a target voltage that the bus power is regulated at by a mount proportional to the difference.

8. The power management method as claimed in claim 7, comprising:
    regulating the bus power at the target voltage according to power delivery negotiation with a sink controller of the sink device.

9. The power management method as claimed in claim 7, comprising:
    providing a power supply to supply power to the bus power; and
    disconnecting the power supply from the bus power if the difference exceeds a predetermined value, thereby the power supply stops supplying power to the bus power.

10. The power management method as claimed in claim 7, comprising:
    detecting a bus current flowing through the power pin or the ground pin; and
    controlling the bus power in response to the difference and the bus current.

11. The power management method as claimed in claim 7, comprising:
    exchanging data, via the communication pin, with a sink controller of the sink device for power delivery negotiation.

12. A power management method for controlling a connector with a power pin, a communication pin and a ground pin, the power management method comprising:
    exchanging data, via the communication pin, with a source controller of a source device for power delivery negotiation;
    detecting a voltage at the communication pin to record a first voltage when receiving a first signal of a predetermined logic from the source controller during exchanging the data;
    sinking a bus current from the power pin and detecting the voltage at the communication pin to record a second voltage when the sink controller receives a second signal of the predetermined logic from the source controller during exchanging the data; and
    controlling the bus power in response to a difference between the first and second voltages.

13. The power management method as claimed in claim 12, comprising:
    sensing the bus current; and
    limiting the use of the bus power in response to the bus current and the difference.

14. The power management method as claimed in claim 12, comprising:
  providing a pull-down resistor connected to a ground pin.

15. The power management method as claimed in claim 12, comprising:
  negotiating with a source controller to regulate the bus power at a predetermined safe rating.

16. The power management method as claimed in claim 15, comprising:
  negotiating with a source controller via the communication pin.

17. The power management method as claimed in claim 12, wherein the source controller drives the communication pin to a first predetermined voltage when sending signals of the predetermined logic, and to a second predetermined voltage when sending signals of another predetermined logic, and a gap between the first and second predetermined voltage is a constant.

* * * * *